(12) United States Patent
Nguyen (10) Patent No.: US 6,910,710 B2
(45) Date of Patent: Jun. 28, 2005

(54) CHAIR CARRIER CONVERTIBLE CART

(76) Inventor: Trong Nguyen, 8109-1 Fruitridge Rd., Sacramento, CA (US) 95820

( * ) Notice: Subject to any disclaimer, the term of this patent is extended or adjusted under 35 U.S.C. 154(b) by 0 days.

(21) Appl. No.: 10/314,464

(22) Filed: Dec. 9, 2002

(65) Prior Publication Data
US 2004/0108689 A1 Jun. 10, 2004

(51) Int. Cl.$^7$ ................................................ B62B 1/00
(52) U.S. Cl. ................................. 280/651; 280/47.371
(58) Field of Search ........................... 280/651, 638, 280/639, 648, 655.1, 659, 30, 47.18, 47.23, 47.25, 47.371, 47.27, 47.29, 47.28, 655, 35, 640, 47.17, 47.315; 211/151, 145, 134; 254/10 C; 248/241; 414/738, 495; 16/436, 437, 900

(56) References Cited

U.S. PATENT DOCUMENTS

| | | | | |
|---|---|---|---|---|
| 2,212,053 A | * | 8/1940 | Smith | 280/651 |
| 2,419,422 A | * | 4/1947 | Schulein | 280/651 |
| 2,572,780 A | * | 10/1951 | Tackenberg | 280/651 |
| 3,197,224 A | * | 7/1965 | Kappen | 280/651 |
| 4,493,492 A | * | 1/1985 | Balabanova | 280/651 |
| 4,505,495 A | * | 3/1985 | Foss et al. | 280/651 |
| 4,526,399 A | * | 7/1985 | Holtz | 280/655 |
| 4,655,466 A | * | 4/1987 | Hanaoka | 280/47.371 |
| 4,784,405 A | * | 11/1988 | Stein | 280/655 |
| 4,974,871 A | * | 12/1990 | Mao | 280/651 |
| 5,018,931 A | * | 5/1991 | Uttley | 414/495 |
| 5,174,548 A | * | 12/1992 | Mueller | 254/10 C |
| 6,196,560 B1 | * | 3/2001 | Ohlsson | 280/30 |

* cited by examiner

Primary Examiner—Hau Phan
(74) Attorney, Agent, or Firm—Mark C. Jacobs

(57) ABSTRACT

A convertible cart for restaurants for carrying stacked chairs when a convertible section of the cart is in a first position. The cart is adapted for carrying a trough of dishes, food, and other dining items, food when the convertible section is in a second position. The cart features a convertible preferably tubular U-shaped section spaced up from the base that pivots from the vertical to the horizontal. The U-shaped section carries a pivotable support arm engageable to either the cart handle when the U-shaped section is in the first vertical position, or engageable to the cart base when the convertible section is in the second horizontal position. A trough or flat board can rest on or be engaged with the U-shaped section when in the horizontal position for carrying utensils, food, waste, condiments or the like, as utilized by a restaurant or bar.

21 Claims, 9 Drawing Sheets

CHAIR CARRIER CONVERTIBLE CART

FIELD OF THE INVENTION

This invention pertains to a cart most suited for restaurants that can be used as a chair carrier, and converted to carry a specially designed tray for the movement of dishes, pots or even meals as may be desired.

BACKGROUND OF THE INVENTION

Convertible cart is a very broad term that applies to a multiplicity of apparatuses all of which can be used for two or more tasks or for the transportation of two or more different items.

Apparatuses for carrying a multiplicity of chairs for return to or delivery from a storage facility or other location to a restaurant or banquet hall, or convention centre is known in the art. Typical of such patents is U.S. Pat. No. 1,912,864, of Stannard, whose apparatus was designed to carry a plurality of folding chairs as might be used in an auditorium of a school or the Elks Club, etc.

Another convertible cart is disclosed and claimed in the Dahl patent, U.S. Pat. No. 5,476,282. This patent however serves a different industry. It is intended for the movement of large musical instruments, PA equipment, electronic keyboards and the like. There are indeed many patents cited in the Dahl patent all of which pertain to the movement of large items used at public gatherings, concerts and the like, all of which are dubbed "convertible carts" because one portion or another folds down or is moveable, etc.

Yet, another approach to convertible carts is found in the patent of Nelson U.S. Pat. No. 4,165,088. This product is for janitorial needs including the disposal of bags of trash.

In today's world, many restaurant owners are expanding their seating capacity by utilizing a portion of the sidewalk adjacent the restaurant after getting the proper permits. Today, on Lincoln Road in Miami Beach, there are several blocks of restaurants all of which use a portion of the traffic closed-off thoroughfare for outdoor seating but at the end of the evening it is necessary to bring in all of the tables and chairs in order to avoid theft, or possible weather damage.

There is indeed a need for a cart that transports a multiplicity of chairs from one location to another easily and quickly. The problem is, the cart itself. Carts take up valuable floor space in a restaurant, space that can better be served as an income producing zone. In addition, single purpose carts are only used in the morning before lunch, and in the late afternoon after the dinner or post theatre crowd, depending upon the city locale in question. Thus, single purpose chair carrier carts are not overly cost effective due to their limited usage. There is indeed a need therefore for a multipurpose cart that not only will transport chairs where and when needed, but can also serve as a cart usable by wait staff for serving or by the bus crew for cleaning up. Applicant has devised such a cart. The invention accordingly comprises the apparatus possessing the features, properties, the selection of components which are amplified in the following detailed disclosure, and the scope of the application of which will be indicated in the appended claims.

For a fuller understanding of the nature and objects of the invention, reference should be made to the following detailed description, taken in conjunction with the accompanying drawings.

SUMMARY OF THE INVENTION

A wheeled convertible cart, of the overall size of a supermarket cart, to be pushed by one person, which cart can carry a plurality of up to about eight stackable chairs from a first location to a second location. The movement of the wheeled cart requires but one person, who after the delivery of the chairs for setup or storage, can quickly and easily change the configuration of the cart and then use the cart for other restaurant chores. The cart has a wheeled base, an elevator section for carrying the chairs, and a convertible U-shaped section that is pivotably mounted vertically when chairs are being carried, such as to be out of the way. The U-shaped section pivots downwardly to a horizontal position to carry a trough, tray or board on which restaurant accouterments can be carried. A pivot arm attached to the center of the convertible section engages the cart handle to maintain the convertible section in the vertical position, and the pivot arm engages the base to help support the convertible section in the horizontal position.

It is a first object to provide a cart that can be moved by one person and which will carry at least six stacked chairs.

It is a second object to provide a cart which while having the capacity to carry chairs from one location to another and which takes up very little floor space.

It is a third object to provide a cart that can be quickly and easily converted from a chair carrier to a bussing station.

It is a fourth object to provide a convertible cart that uses light weight metal tubing for its body, and rubber rear tires to prevent damage to expensive carpets of a restaurant.

It is fifth object to provide a chair carrier having fully pivotable front wheels, and high quality front casters such as to provide instant tight turning radius.

Other objects of the invention will in part be obvious and will in part appear hereinafter.

DESCRIPTION OF THE PREFERRED EMBODIMENT

Figures 1, 2, 3:
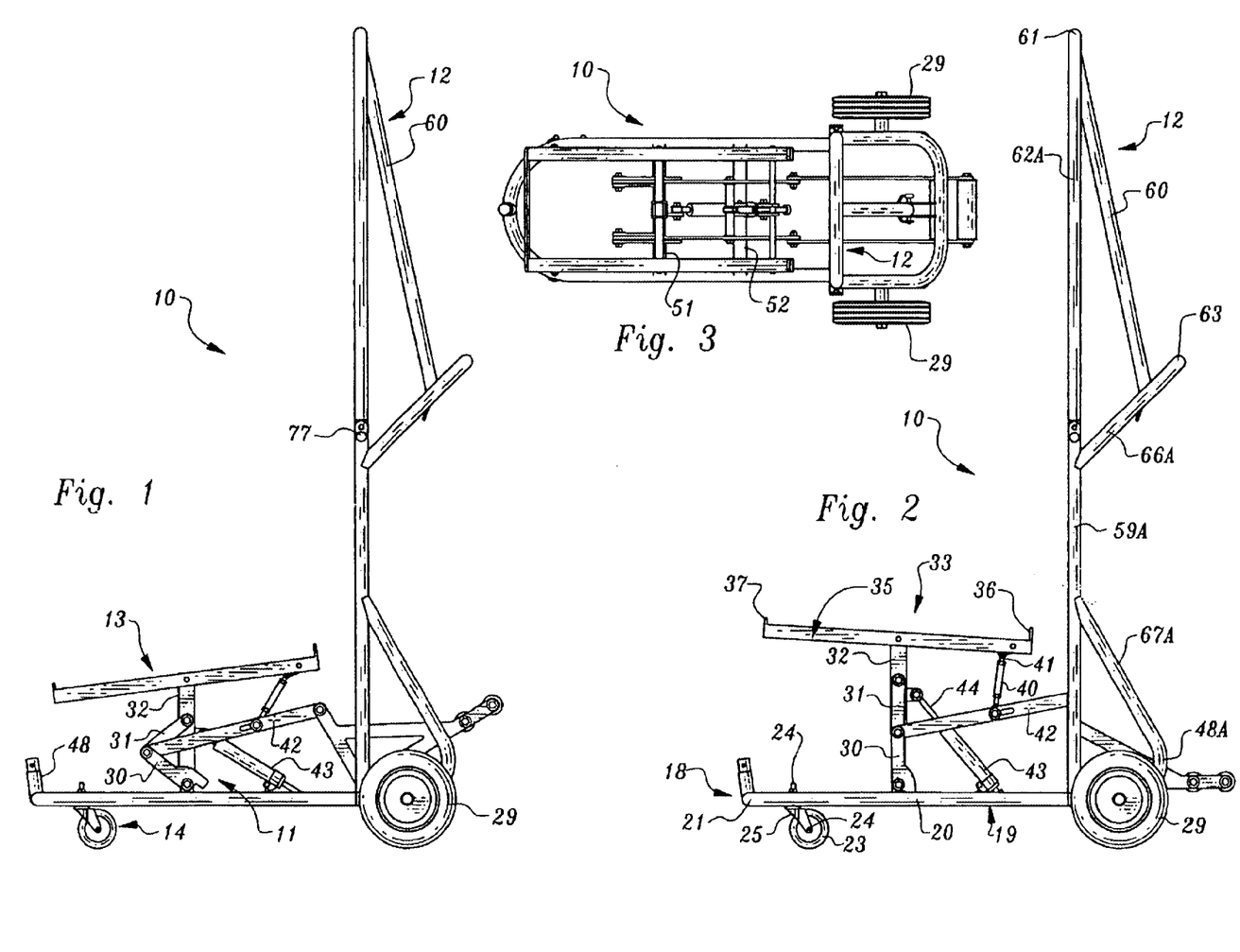
FIG. 1 is a left side elevational view of the apparatus of this invention in the chair carrier orientation with the elevator in the lowered position.
FIG. 2 is a view similar to FIG. 1 with the elevator in the upper position.
FIG. 3 is a top plan view of this apparatus.

In FIG. 1 the apparatus of this invention is seen in its chair carrying position, which is a first position, from which it converts to a cart for carrying a tray or tub, its material carrying position, which is its second position. From FIG. 1 it can be discerned that the apparatus is seen to comprise a trio of interconnected sections. The first is the convertible section 12, which moves from a first or pushing—vertical position, to a second horizontal support position. The second portion 13 is the elevator portion having an elevator platform 27 as a part thereof, and is used to receive and support a plurality of chairs for transit from a first locale to a second locale. The third section is the base or framework section 11, which carries the wheels 29 and the front casters 14. Each of these sections will be discussed in more detail infra. If two spaced similar elements are present, they may be designated as "A" and "B" units after the appropriate numerical designation, as in 59A, 59B. If the number alone is used, it is being used collectively for both, as 59. Other numbers may have a letter appear after the numerals as with a T number for throughbore.

Figure 6:
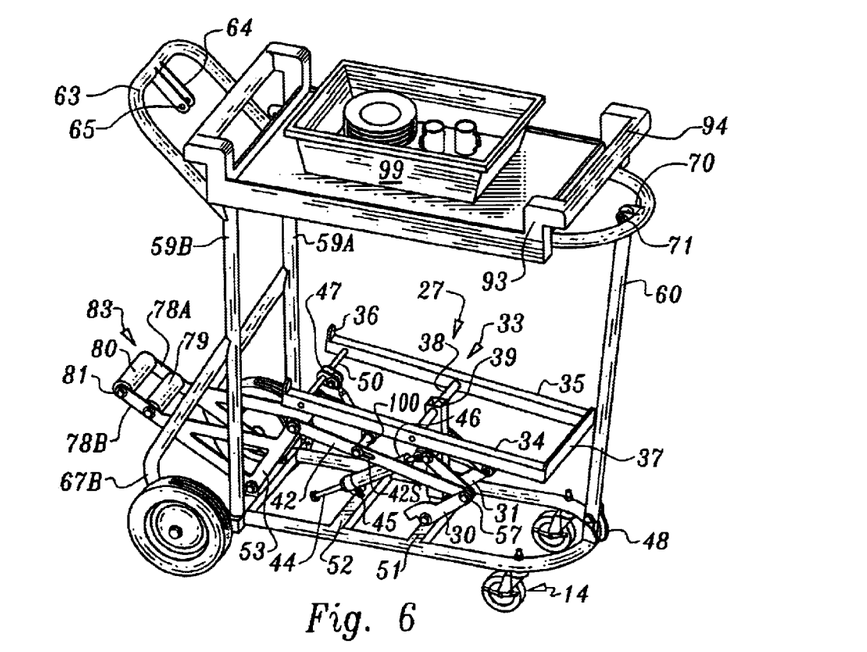
FIG. 6 is a right perspective view of this apparatus in the cart orientation.
Figure 9:
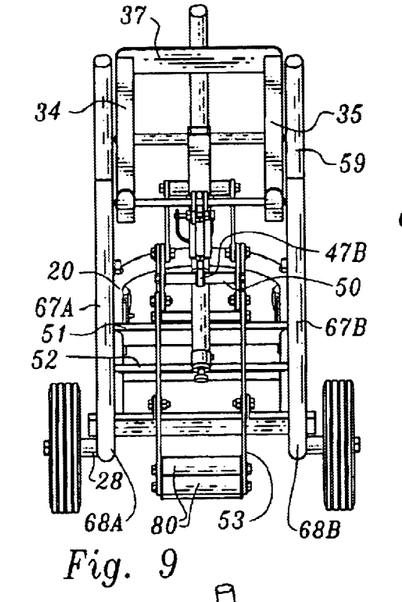
FIG. 9 is a closeup view of the elevator mechanism in the upper position.

Reference is now made to FIGS. 2 and 6 which illustrate the apparatus in the two positions previously mentioned. As seen in those figures, the base 11 comprises a base main member 19 which may be formed of two mirror image parallel tubes 20 and 22 joined at their forward ends to a front arcuate tube 21. Or base member 19 can just be two tubes, each bent into the form of half of a cathedral window, wherein the two arcuate sections meet a tip point 15 equidistant from each side. Per FIGS. 6 and 9 there are three spaced cross members 51–53 disposed in a spaced relationship from the front tip point 15. Mounted beneath base main member 19 an equal distance from point 15 is a pair of casters 14, consisting of frames 25, each having a caster wheel 23, in the frame. The frame is retained by a threaded end bolt 24 having a nut 26 thereon. See FIG. 2 and more particularly FIG. 13.

Exiting outwardly and normal to, at the rear of each of the base tubes 20 and 22 and to the rear of vertical tubes 59A, 59B, are axle stubs 28 to which are conventionally mounted rubber tire wheels 29; one on each of the left and right sides of the cart.

Figure 13:
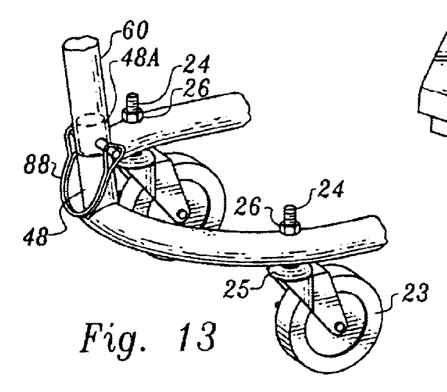
FIG. 13 is a closeup perspective view of the nose of this invention.

Reference is made again to FIG. 13. Here the pipe stub 48 is seen in closeup. What is not seen, but which is shown in dashed lines is the smaller stub 48A which may be a solid or tubular section, of a slightly narrower dimension. That is, 48A has an exterior diameter equal to the interior diameter of 48 and the interior diameter of pivot arm 60. Smaller stub 48A is welded or otherwise attached within the confines of stub 48, such that the pivot arm fits over it during engagement as is seen in FIG. 13.

The discussion now moves to the elevator frame 33, seen in FIGS. 2, 5, 6 and 11 among others. In FIG. 3 it is seen from the underside, as this figure is a bottom plan view of the apparatus. Frame 33 is a generally rectangular member formed of two parallel spaced and aligned long tubes 34, 35 that extend along the front to rear axis of the apparatus. These are connected at their respective front ends a brace 37 which has its wider dimension disposed vertically and its thickness disposed transversely, a mid-cross rod 38 and a rear cross-member 50 disposed spaced slightly from the rear end of the parallel tubes 34, 35 of the elevator 13. This brace 37 serves to stabilize the elevator platform 27 of the elevator portion 13. Each of the two tubes 34, 35 has an upstanding flange 36 at the rear end thereof. All of these components are seen in FIG. 6. At the rear of each of the tubes 35, 34 of the frame 33 there is an upstanding flange 36 which serves as a stop to prevent the rearward sliding of chairs when disposed thereon as will be explained infra.

Square tube 32 has a rearwardly disposed flange 32F for attachment of a hydraulic damper per below. Square tube 32 also has a pair of aligned bores 39 at its upper end, through which passes x-rod 38. See FIGS. 11 & 12. Disposed within the tube 32 is a slider 54 which slider is fixedly secured to the front cross member 51.

Figures 21, 22:
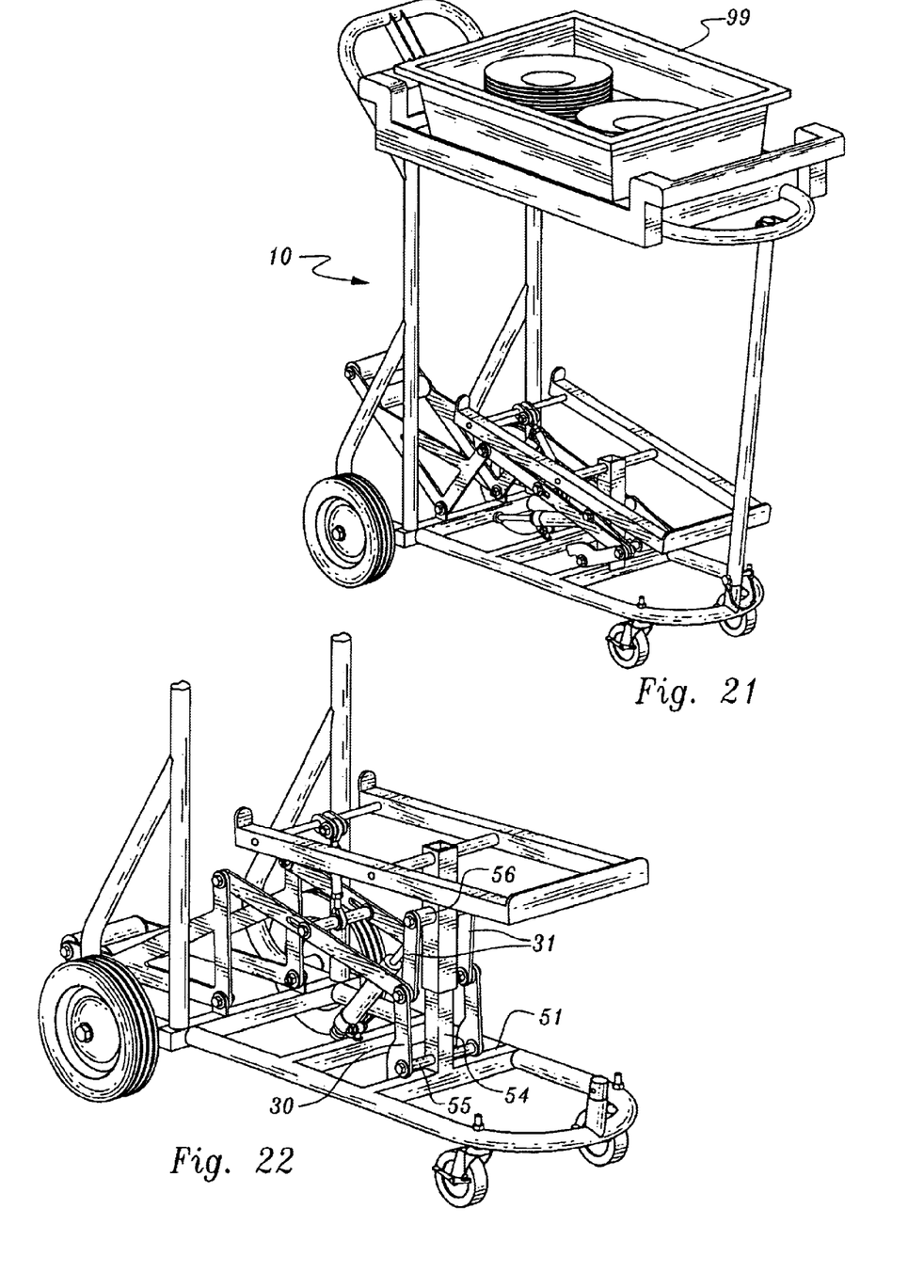
FIG. 21 is a right front perspective view illustrating the use of this apparatus in the cart orientation.
FIG. 22 is a view similar to FIG. 19 with the elevator frame in the up position.

The piston 44 of hydraulic damper 43 has a pin receiving terminus which is pinned to the flange 32F in a conventional manner. See FIG. 12. Slider 54 per FIG. 22 is vertically fixedly secured to the front cross member 51 and it has a bore spaced up slightly from the lower end thereof. A pin 55 passes through the unnumbered bore in slider 54. This pin 55 is spaced up slightly from front cross member 51, and is pinningly connected to each of a pair of spaced parallel and aligned first elevator links 30 to permit movement of the left and right links 30. See FIGS. 6 and 22.

Figures 17, 18, 19:
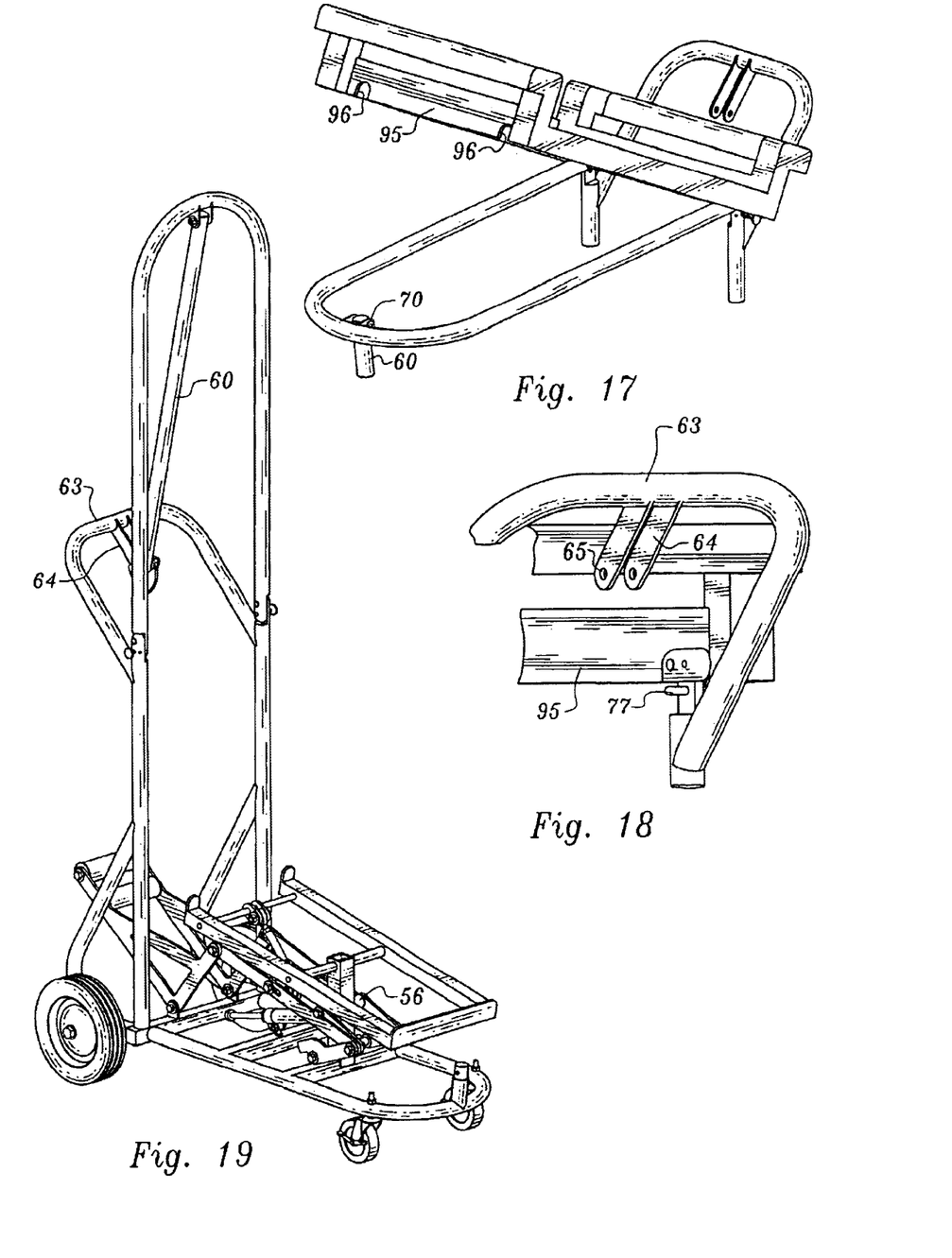
FIG. 17 is a top perspective view of a portion of this invention at a point in time with the tray carrier in the process of removal from the apparatus.
FIG. 18 is a rear perspective view of a portion of this invention.
FIG. 19 is a right front perspective view of the apparatus in the chair carrier orientation with the elevator frame in down position.

Links 30 are spaced apart in alignment, and each is pinningly connected to a respective left and right second link 31 per FIGS. 2, 19 and 22 among other views at one end thereof by pin 57 seen in FIG. 6. The second end of each of the two spaced second links 31 are respectively pinningly connected to a respective laterally outwardly extending boss 56 located at about the midpoint of the elevation of square tube 32.

Figure 11:
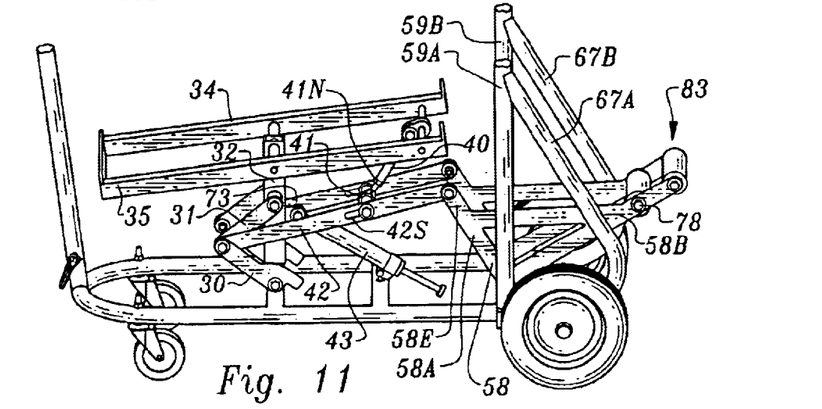
FIG. 11 is a left side perspective view of the elevator mechanism in the lower position.
Figure 12:
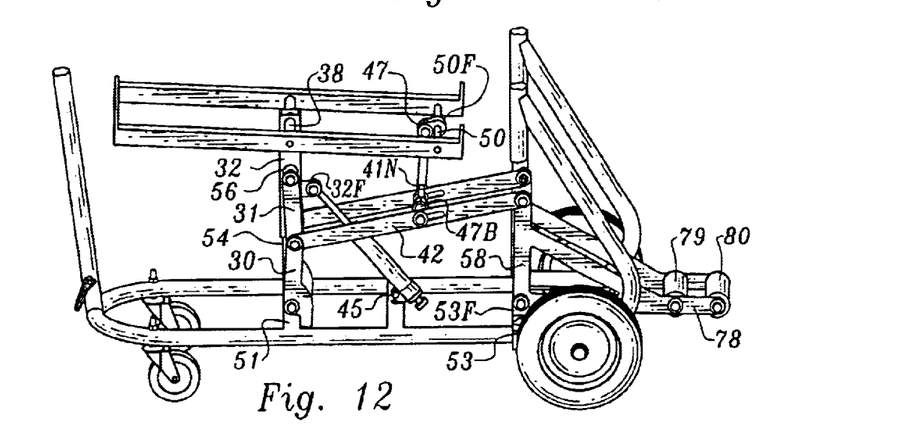
FIG. 12 is a left side perspective view of the elevator mechanism in the upper position.

One of a parallel pair of spaced, slotted, long rods 42 are each connected at one respective end, the forward end, to the one of the same respective pins 57 between each of the pairs of the two links 30 and 31. See FIG. 12. The second end, the rearward end of each slotted, long rod 42 is pinningly connected to one of a respective pair of triangular plates, 58. See FIG. 11. Triangular plate 58 as per FIG. 12 is seen to have a base 58A which has an extended section that directed outwardly past the junction of the hypotenuse 58C to the base 58A. It is on this extended flange that the junction with slotted, long rod 42 is situated. Backing up to FIG. 11, it is seen that the triangular plate 58 has the extended base 58A, and a somewhat vertical side 58B disposed normal to the base, and a hypotenuse 58C, connecting the second end of the somewhat vertical side 58B to a point spaced in from the end of the base 58A, rather than at the terminus of the base 58A. The portion that extends out past this junction is designated 58E, per FIG. 11.

It is to be noted any and all of the pinningly connected junctions comprise a bolt having only terminal threads, which bolt carries suitable spacer washers, and which is threadedly engaged to a suitable nut to permit rotation around the nonthreaded portion of the shaft as is deemed to be a conventional connection in today's world.

The rear cross member 53 previously referred to, has a pair of spaced upstanding flanges 53F each of which is bored for pin connection through the right angle corner of the triangle plate 58. The spacing of each of the flanges 53F is aligned to match the spacing between the respective slotted, long rod 42 and the respective junctions with the two links 30, 31 on either side of box tube 32. Each of the two apexes or junctions of the sides "C" and "A" of the two triangle plates 58 is pinningly connected to a short link 78 per FIG. 11. At the lower or more forward of the two triangles to short link connections, the pin connecting them is threadingly disposed into a rubber-covered roller 79. At the proximal end of the short link pair 78, a second rubber roller 80 is connected between the two links by a pin. Each of the roller connections between the spaced links is a threaded pin 81 having a nut thereon to permit rotation of the roller when stepped upon. The two spaced rollers together, separated by the length of the short link 78 serve as a foot pedal, designated 84, in a manner to be discussed infra. Thus while the rollers are able to rotate individually, they are held in position, and are moved upwardly by the top of the shoe, and downwardly by the shoe sole.

Another component on the base to be discussed is the hydraulic damper, 43. This hydraulic damper 43, includes a sliding piston 44 seen in FIGS. 2 and 6 among other figures. The hydraulic damper is mounted at about a 45-degree angle by mount flange 45 to the middle cross member 52. This mount flange circumscribes the lower part of the damper and is bolted in place to the X-member 52. A pin 73 passes through a rounded terminus of the upper end of the piston 44 which is disposed in the rearwardly directed flange 32F of the square tube 32. This pin ties the piston to the square tube. See FIGS. 12 and 22. The hydraulic damper serves to do its function; namely, to dampen the movement of the foot pedal 83 which is the combination of the pair of spaced short links 78 and the two rollers 79, 80-disposed there between. Basically, it helps to prevent slippage of the elevator portion 13 from one position to the other.

The movement of foot pedal 84 moves the elevator portion 13 from its lower position to its upper position. In FIGS. 6 and 11 the pedal is in the upper location and the elevator 13 is down. Contrast the movement of the interconnected links to FIG. 12 wherein the pedal is down and the elevator 13 is in its upward location. Contrast also FIG. 21 and FIG. 22, which are seen from the same vantage point with the elevator up—pedal down in FIG. 22 and elevator down—pedal up in FIG. 19.

Reference is now made to, and contrast should also be made between FIGS. 1, 6, 11, 19 and 21 on the one hand, wherein the elevator supports 34 & 35 are tipped forwardly, the normally empty position and FIG. 2, versus FIGS. 2, 12, 2 and 22 wherein the elevator supports 34 & 35 are canted rearwardly, i.e., the position when chairs are to be carried. The purpose of this contrast is to draw attention to a little noticed feature and consequently a little noticed benefit of the apparatus of this invention.

That feature is the ability to adjust the actual elevation of the elevation supports 34 and 35 to ensure that when in the down position that all four feet of the chair land at the same time. The discussion therefore centers on FIG. 24.

First it is necessary to point out that most plastic stacking chairs have the rear of the chair slightly lower than the front of the chair to aid in stacking. That fact keeps the chair stack from pitching forward, and makes the stack more stable. When the elevator portion 13 is in the down and forward position, the elevator is able to easily slip under the rear of either individual chair 117, or a plurality of stacked stacking chairs. When the elevator portion 13 is raised, the stack of chairs 115 per FIG. 20 leans rearwardly against the two pivotable support tubes 62A and 62B, because the elevator portion 13 is tilted rearwardly.

Figure 24:
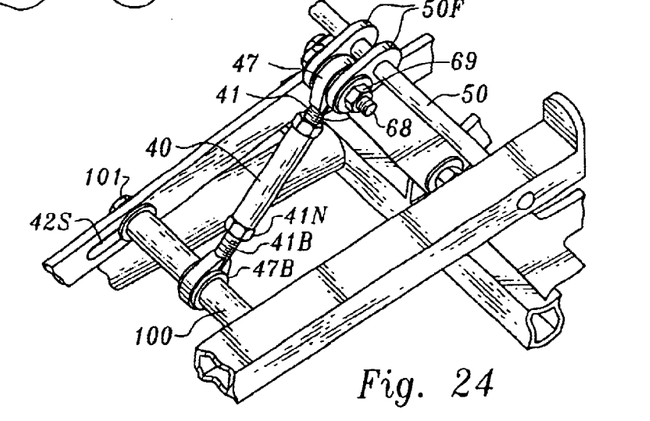
FIG. 24 is a closeup view of the elevator portion adjuster in its operative location.

The structural component that not only provides this action, but which also permits the stack of chairs 117 to descend with all four feet hitting the ground at one time is the adjustment cylinder 40 with its piston 41 seen in such Figures as 2, and 11 and 12 among others but with full particularity in FIG. 24.

Cross member 50 has a pair of spaced, aligned, bored flanges 50F, through which is disposed at threaded on both ends pin 68 which pin is retained by a pair of nuts 69, one on each set of threads. Disposed on the shaft of the pin 68 is one of a pair of opposed adjustable cylinder mounts 47. Cylinder mount 47 is a ball bearing containing annulus that rides on the shaft 68. The mount 47 is disposed at one end of the threaded shaft 41 disposed within cylinder 40. A second similar but oppositely disposed threaded shaft also extends into cylinder 40. A nut 41N is disposed on each shaft adjacent the cylinder such that movement of the nuts relocates the cylinder. The lower shaft 41B has a mount head 47B similar to the mount head 47, but which is disposed on a roller 100. This roller is threaded at both ends and rides within the confines of the spaced opposed slots 42S of slotted long rods 42. Adjustment of these two nuts influences the plane of the elevator portion 13 at both the upper position and the lower position. The adjustment range is within the area of ½ to 1.5 inches for most stacking chairs to ensure that all 4 feet of the lowermost chair impact the floor at the same time. This ensures that the stack does not pitch forward after disposition from the convertible cart of this invention.

Figure 10:
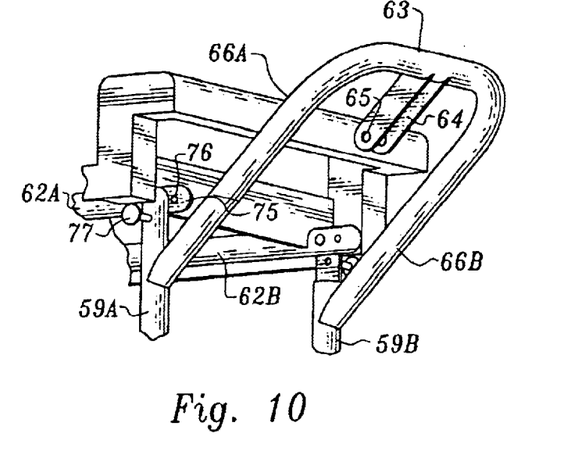
FIG. 10 is a closeup perspective view of a portion of this invention.

The discussion moves down to the third portion of the invention; namely, the convertible section 12, see in FIG. 1. Reference is also made to FIGS. 2, 10, and 11. This section includes the upstanding spaced rear vertical support tubes 59A, 59B which are connected as by welding to the base 19 at about a 90-degree angle. As seen in FIGS. 2, 5, 6, and 9, the respective rear angled supports 67A and 67B are disposed at about a 45-degree angle from about the rear midpoint of their respective vertical rear support tubes 59A, 59B to a point where they are welded or other wise connected to a respective candy cane shaped member 68A, 68B. These two tubular members are welded at their interface, and the second end of the members 68 is welded or otherwise connected, to the rear of the rearmost cross member 53. See particularly FIG. 9. The two respective members 59 and 68 can be connected together or formed as one integrated unit as maybe desired. Per FIG. 10, right at the top of each rear vertical tube 59 is a small area 83 just above the angled junction of the hand side tubes 66 designated 83. Here on the interior side of the tube 59A is a rearwardly disposed semi-arcuate flange 75 having a through bore 76 which serves to. While not shown on the respective 59B tube, such bored flange is also contemplated on that tube as well.

Figure 23:
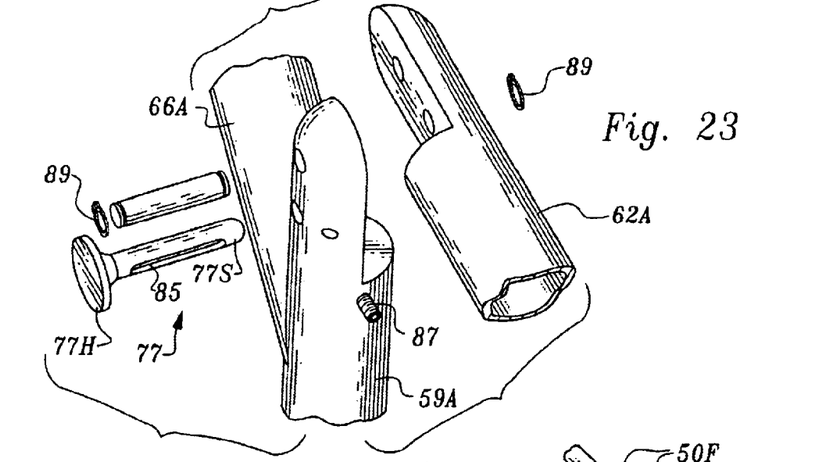
FIG. 23 is a closeup view of a minor component used in the assembly of the apparatus of this invention.

Pin 77 seen in FIGS. 1, 10 and, 22 located in small area 83 extends across the width of the respective tubes 59 and serve to retain the pivot support tubes 62A and 62B in the desired position. Two of these are present in opposed position though one is not readily seen in FIG. 10. As can be seen in FIG. 23, each such pin 77 has a head 77H, and a shaft 77S. The shaft has a partial slot 85 therein, deemed partial because it does not extend all the way through the shaft 77S. Set screw 87 seen also in FIG. 10, disposed in the respective vertical tube 59 rides in the slot and prevents the movement of the pin 77 out of its unnumbered bore. Movement of each pin is also limited by a cotter pin there through. When the pin 77 is disposed inwardly through the pivot tube 62A or B of convertible section 12, the pivot tube cannot move upwardly. When the spring in 77 is moved to the outward position, yet retained by the set screw, the pivot tubes can be moved to the upward position for the chair carrying function.

The two spaced hand side tubes 66A, 66B are connected at their upper ends by an interposed inverted U tube 61 having a clevis 64 forwardly and downwardly disposed therefrom. This clevis 64 has a pair of aligned through bores, 65. Pivot arm 60 can be retained in the clevis by a pin to be disposed through the pivot arm 60 and the through bores 65. See FIG. 4.

Figures 4, 5:
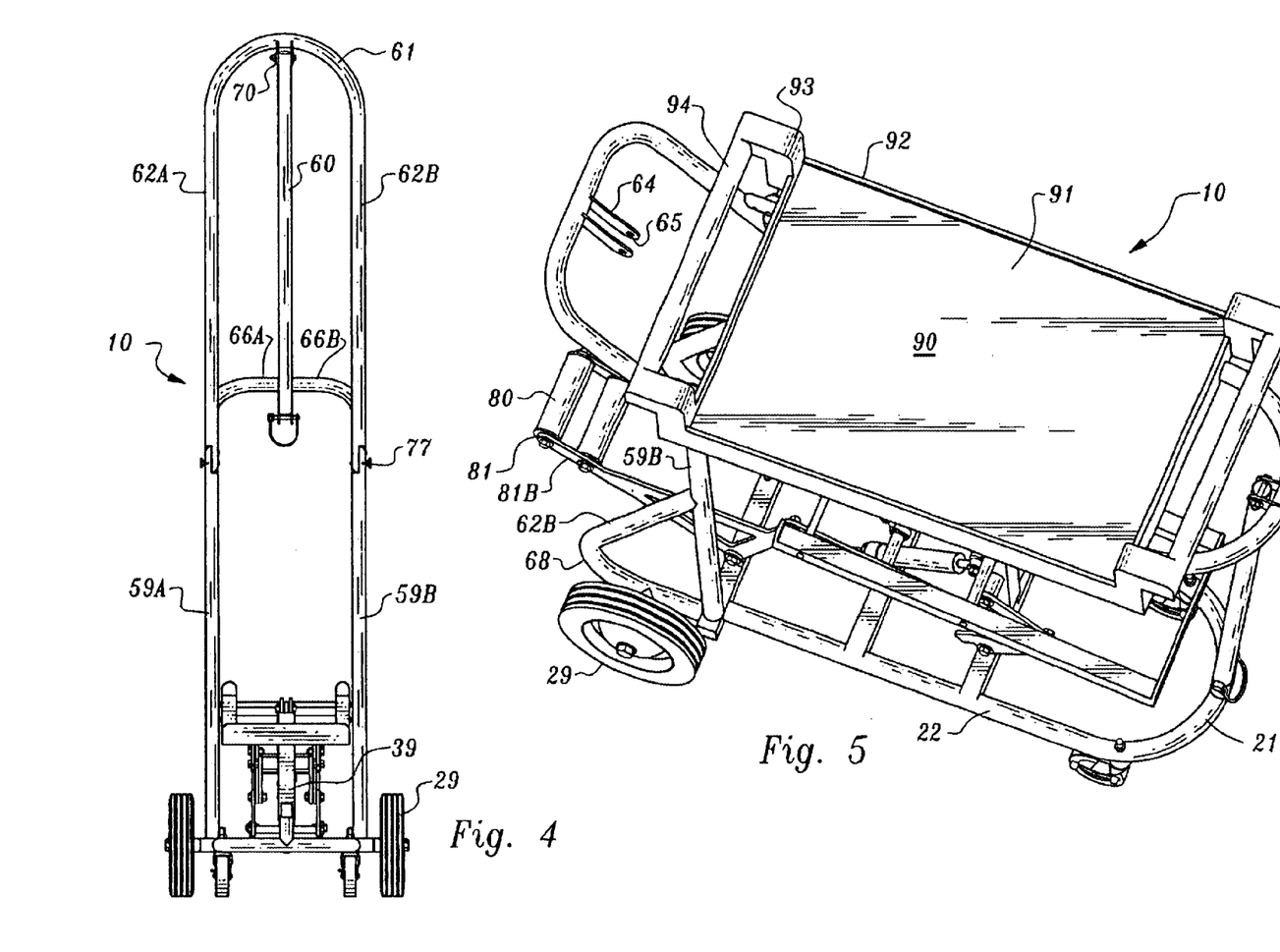
FIG. 4 is rear elevational view of this apparatus with the apparatus in the chair carrier orientation.
FIG. 5 is a top perspective view of this apparatus in the cart orientation.
Figure 15:
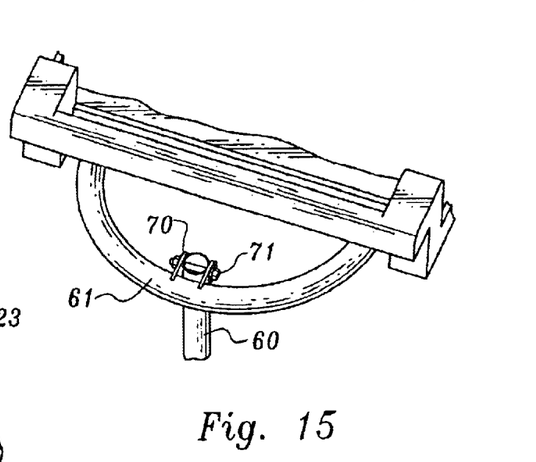
FIG. 15 is a closeup perspective view of a portion of this invention.

Per FIG. 6, it is seen that pivot arm 60 is retained at its upper end by a pin 71 disposed through clevis 70 which has a pair of aligned through bores therein 69 noted in FIG. 4. Whereas pivot arm 60 is permanently pivotally attached to clevis 70—see also FIG. 15, it is releaseably attached to clevis 64 such that the pivot arm can assume two positions, disposed in clevis 64, or in pipe stub 48. Pipe stub 48 is of the same cross section as pivot tube 60, and is welded onto the base at front point 15. It has an upstanding hidden section, of slightly narrower cross section, linearly and outwardly directed. The hidden section is sized to nest within the free lower portion of pivot arm 60. This hidden section has a cross bore through which the U pin 88 is disposed for releaseably anchoring the pivot arm 60 to the base. This can be seen in FIGS. 6 & 7 and 13 at front point 15 on the base.

The next section for detailed discussion is the convertible section 12. A pair of spaced convertible support tubes 62A and 62B per FIGS. 2, and 4 are seen to be pivotably connected to area 83 at the top of the respective vertical tubes 59, that is 59A and 59B. The tubes 62A, 62B are seen in FIG. 2 to be in the vertical position, the position to be assumed when the convertible cart is to be used for carrying chairs. These two spaced convertible tubes are connected to the interposed inverted U-tube 61. See FIG. 2 and FIG. 4. It is within the scope of this invention to make the two tubes 61A, 61B and the inverted U-tube 61 as a single integrated tube. Disposed rearwardly at about the midpoint of the tube 61 is a clevis 70 to which the pivot arm 60 is permanently pinningly engaged, such that it can dangle and be relocated as needed according to the invention. See supra. While a clevis is disclosed, other releaseable arm engaging means may be employed instead.

For quick reference FIGS. 1, 2, 19, 20 and 22 all show the convertible cart with the convertible U-shaped section 12 comprising the pivotable support tubes 62 in the vertical position and the pivotable arm 60 pinned to the clevis 64, which is mounted on handle 63. In contrast FIGS. 3, 6, 7, 8, and 21 all show the cart being used to carry dishes and other items. Here the pivotable support tubes 62 are in a horizontal position, and the pivot arm 60 is pinningly engaged to the front of the base at location 15.

USE OF THE INVENTION

Figure 20:
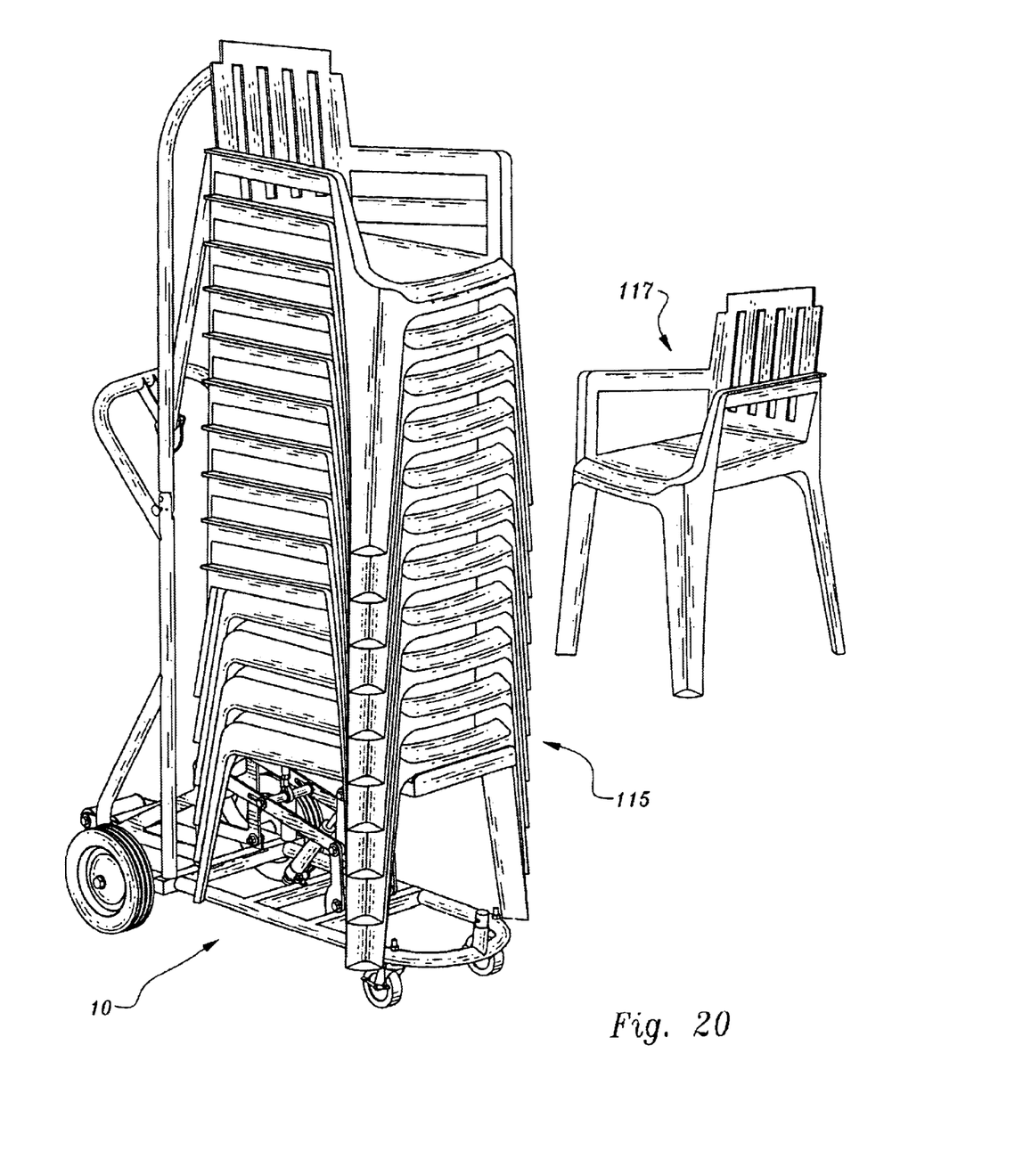
FIG. 20 is a front perspective view illustrating the use of this device in the chair carrier orientation.

As has been explained in detail, the key to success of this cart is the convertibility. That is, the convertible section 12's ability to move from a first vertical to a second horizontal position and be retained in each such position. As noted supra, the combination of the spaced tubes 62 and the interposed inverted U tube 61 are pivotably mounted at location 83 spaced up from the base. When this section is in the vertical position as per FIG. 19, and the pivot arm 60 is engaged to the handle 63's clevis 64, the convertible section is retained vertically. Note how the elevator is down and the foot pedal (comprised as noted of the short link 78 and the two rollers 79, 80) is up in this same FIG. 19. A person can then place a stack of stacking chairs on the elevator as is shown in FIG. 20. Prior to moving the cart, the foot pedal is pushed downward such that the elevator is moved upwardly from a slightly forwardly tilted position, designed for loading—see FIG. 1—to a slightly rearwardly tilted position for transportation, with the foot pedal down per FIG. 22. The little stop or rest 36 helps to hold the load of chairs in place. The hydraulic damper serves to ensure a smooth transition of the linkage from a first positive location to a second positive location when the foot pedal is user actuated. It is believed that a detailed explanation of the movement of each link when the foot pedal is actuated is not needed as such lies within the skill of the art, since the connection of each of the links individually has been recited. The relationship of the foot pedal's connection to the spaced triangles 58, in turn to the slotted, long rods 42, and the links 30 and 31 and their connection to the square tube 32, such that the tube 32 can ride upwardly on the slider 54 seen best in FIG. 12, is readily understood by those skilled in the art. So too is the connection of the damper to the square tube readily seen from a contrast of FIG. 11 to FIG. 12.

Figure 7:
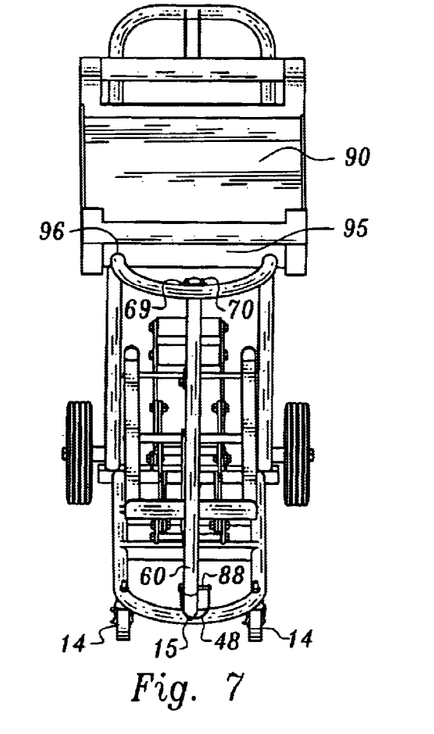
FIG. 7 is a front perspective view of this apparatus in the cart orientation.
Figure 8:
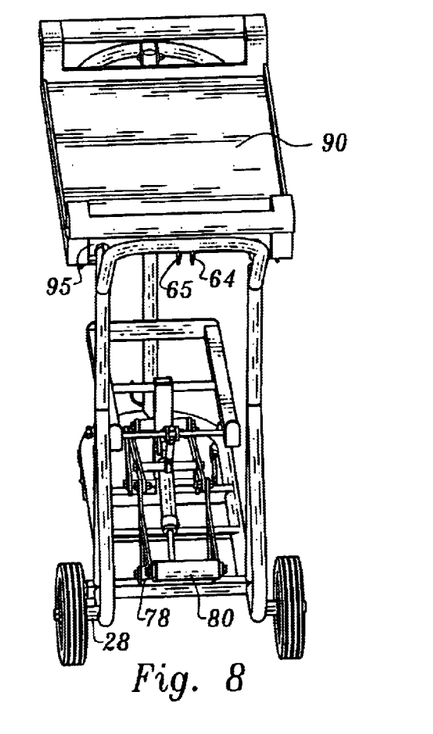
FIG. 8 is a rear perspective view thereof.

The discussion now turns to the mounting of cart-tray 90 to the cart as is seen in FIGS. 3, 6, 7, 10 and 14. This cart-tray has a base 91, of a generally rectangular shape. See FIG. 5. It has spaced side walls 92 and front and back opposed mirror image raised arms pairs 93, which are interconnected in back and front, by handles 94. The ends 95 of said cart-tray are seen in FIGS. 7, 8, and in closeup in FIG. 16 depend downwardly between the arms 92 are preferably cut out at locations 96 in front and back in a hemispherical pattern to best receive the tubular convertible arms of section 12. See also FIGS. 14 and 16. Reference to the frozen in time view of FIG. 17 illustrates how the cart-tray fits on the convertible section 12 after the rear of the cart-tray has been disposed on section 12, best seen in FIG. 18.

Figures 14, 16:
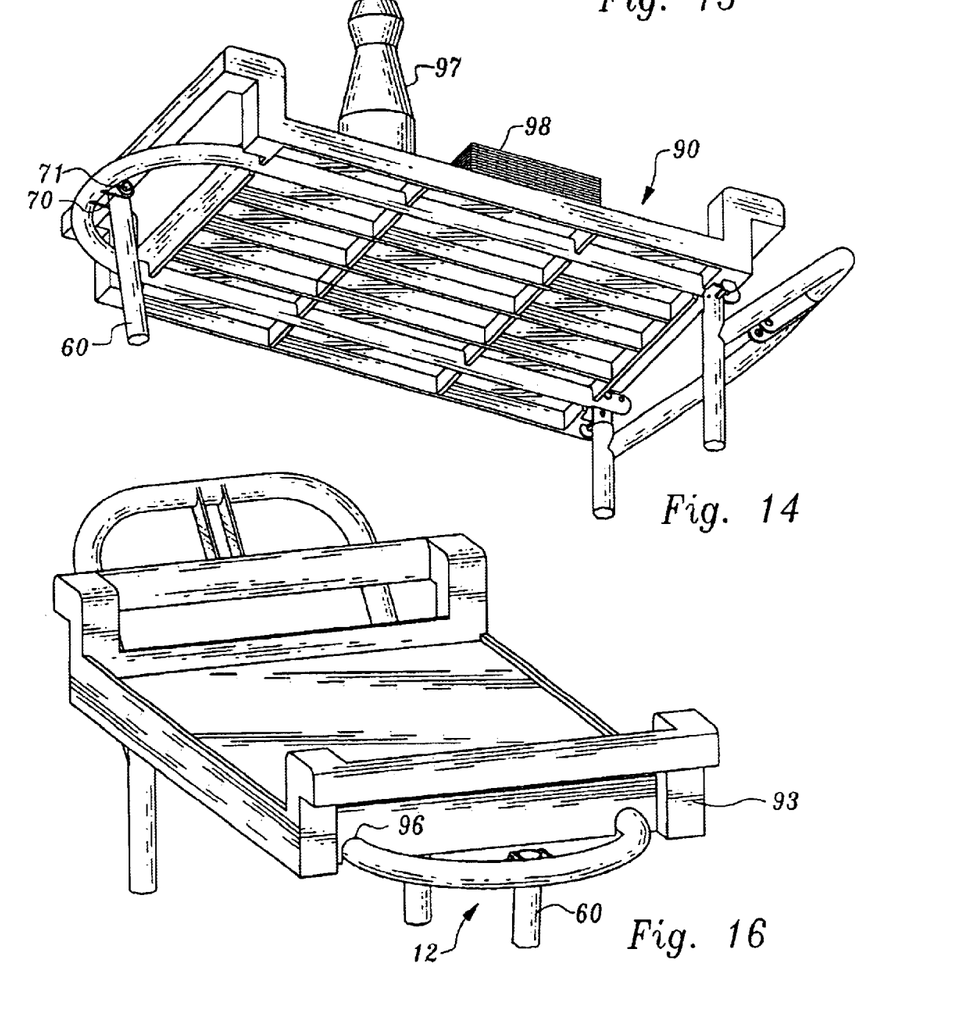
FIG. 14 is a bottom perspective view of a portion of this invention in the cart orientation.
FIG. 16 is a front elevational view of a portion of this invention with a tray carrier mounted thereon.

As can be seen by returning back to FIG. 6, the cart-tray 90 is capable when mounted to hold a dirty dish trough. As seen in FIG. 14, a stack of folded napkins 98 are sticking off the cart-tray 90. Also seen is a large pepper grinder 97 as is often found on the table of fancy restaurants.

Of course the cart can be used in this position to carry many other things on the cart-tray such as silverware, vases of flowers, etc.

It was mentioned earlier that a flat piece of wood such as plywood can also be placed on the convertible section when horizontal and be permitted to hang over the two sides and perhaps even the front slightly, in order to move other items that might not fit within the confines of the cart-tray. These include such restaurants found items as amplification systems, small lecterns, wedding cakes, etc. While not illustrated, it is within the skill of the art to understand this concept since the small sheet of plywood would merely rest on the convertible section, when the convertible section is placed and pinningly locked into the horizontal position.

Figure 25:
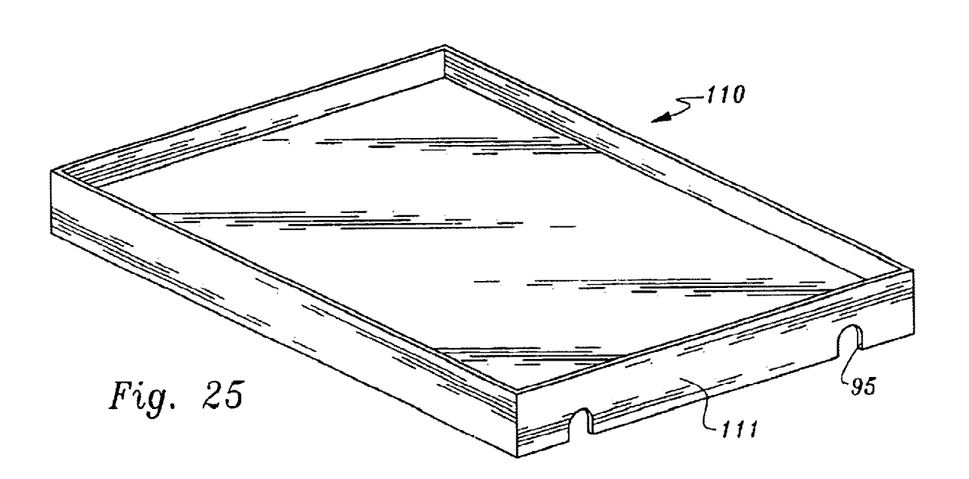
FIG. 25 is a perspective view of a preferred cart tray for use as part of this invention.

In addition to the cart tub 90 discussed supra for mounting on the cart of this invention, Tray 110, the preferred tray as seen in FIG. 25 can also be used. This tray 110 is about 15.625 width by 23.25" long by 1.75 high with the shelf recessed about ½ inch from the top. The two end walls 111 each have the cathedral window cutouts for disposition of the try upon the cart in the same manner as handled tray 90. This tray is more intended to receive other items for use in a restaurant, rather than a deep stack of dirty dishes. Thus flower arrangements, napkin holders, and other service items can be neatly presented to the diners, as opposed to being recessed out of view in the tray 90.

While the discussion for the most part about this invention has centered on its use for moving and relocating a plurality of stacking chairs, or when the pivot arm is down, for transporting dishes and other restaurant items such as roasts for carving or floral decorations. The cart of this invention is strong enough to be used for transportation of an elderly or incapacitated person while sitting either in a stack chair or a light weight wheel chair, from point A such their room in a convalescent hospital to point B, the dining room or to point C, the TV lounge of the convalescent hospital. Of course, it is understood that a seat belt holder would be welded to each of the two pivot arms for one of the two portions of a seat belt. Such minor engineering is within the skill of the artisan. Or in the alternative the seat belt could be built onto the chair to be carried by the cart of this invention.

The benefit of moving the person in a stack chair is that they would then be seated in a chair probably quite similar to what other elder or incapacitated persons might be using at point B or point C at institution. Thus, any potential for a feeling of embarrassment due to differences is eliminated.

The discussion heretofore has been on the convertability factor of the cart of this invention. Thus as spelled out supra, pin 77 permits the rotation of the pivot support tubes 62A and 62B to change the cart from a chair carrier to a dish, pot, linen etc. carrier and back. But there may be customers who have no need for the convertability factor. For them, pins 77 can be eliminated, such that tubes 62A and 62B are constructed permanently attached through nesting or welding among other modes to their respective lower positioned respective tube 59A and 59B. In such instance the position of the cart as shown in FIG. 2 would be a permanent one. Since this minor construction deviation is deemed to be well within the skill of the art, no separate illustration is deemed necessary.

The apparatus of this invention may be made of metal for stability. It is also envisioned to use plastic for all or some of the parts hereof. The cart-tray when used may be made of plastic, or hard rubber or metal as may be desired.

Since certain changes maybe made in the described apparatus without departing from the scope of the invention herein involved, it is intended that all matter contained in the above description and shown in the accompanying drawings shall be interpreted as illustrative and not in a limiting sense.

I claim:

1. A convertible cart primarily for restaurant use, having a base section, a pedal controlled elevator for receiving and transportation of at least one stacking chair, and a convertible section that stands erect out of the way when the cart is used to carry chairs, and which convertible section can move to a horizontal position for carrying of common restaurant items, but not limited to dishes, pots, waste food and other items found in restaurants,
   said cart's base section also having a pair of spaced upstanding tubes at the rear thereof, to which a handle is attached, said handle having a releaseable arm engaging means thereon.

2. A convertible cart primarily for restaurant use, which has a base having a pair of casters at the front and wheels at the rear; said cart also having a pair of spaced upstanding rear tubes, to which a handle is attached, said handle having thereon a releaseable arm engaging means, and
   a convertible section comprising a U-shaped section having a pivot arm pivotally attached thereto, said convertible section being pivotally mounted to said rear tubes; such that when the pivot arm is releaseably engaged to the handle's arm engaging means, the U-shaped section is in a generally vertical position.

3. The apparatus of claim 2, wherein the base includes at the front thereof, means for releasably attaching the pivot arm of said convertible section, when said convertible section is placed in a horizontal position.

4. The apparatus of claim 2, wherein the base comprises a pair of parallel aligned tubes connected at one end, the front end by an arcuate tube, and along the length thereof by a trio of spaced cross members; front, middle and rear; and
   one of a pair of spaced rear angled supports is respectively connected both to one of the upstanding rear tubes and to the rear cross member.

5. The apparatus of claim 4, wherein an elevator is attached to the middle cross member, said elevator comprising an elevator platform, connected to a square tube disposed over a slider, the movement of which is controlled by an interlinked foot pedal.

6. The apparatus of claim 5, wherein the movement of the elevator is dampened by the presence of a hydraulic damper operatively connected to said square tube and connected to one of the cross members of the base.

7. The apparatus of claim 5, further including adjustment means to ensure that the lowermost of a stack chairs when chairs are carried by the elevator portion, upon landing, land with all feet of the lowermost chair touching the ground at the same time.

8. The apparatus of claim 7, wherein the adjustment means can be manually adjusted to achieve the desired result.

9. The apparatus of claim 5, wherein the elevator portion includes means to provide a forward and downward disposition, prior to the loading of a stack of chairs, and when loaded and raised, means cause said elevator portion to assume a rearwardly downward disposition.

10. The apparatus of claim 9, wherein the elevator portion includes means to provide a forward and downward disposition, prior to the loading of a stack of chairs, and when loaded and raised, means cause said elevator portion to assume a rearwardly downward disposition.

11. The apparatus of claim 2, further including a pipe stub having a through bore therein disposed at the front of the base, said stub adapted to receive the pivot arm, when the convertible section is oriented to a horizontal position.

12. The apparatus of claim 2, further including a cart-tray having front and back cutouts for removably mounting the cart-tray in a fixed position on the convertible section of said cart, when said convertible section is in a horizontal position with the pivot arm disposed in said pipe stub.

13. A convertible cart primarily for restaurant use, having a base section, a pedal controlled elevator for receiving and transportation of at least one stacking chair, and a convertible section that stands erect out of the way when the cart is used to carry chairs, and which convertible section can move to a horizontal position for carrying of non-invention related common restaurant items, but not limited to dishes, pots, waste food and other items found in restaurants, said cart's base section comprising a pair of casters at the front and a pair of wheels disposed at the rear of a pair of aligned parallel tubes, which parallel tubes are connected by a lower tube and connected also by cross members between said aligned parallel tubes;

said cart also having a pair of spaced upstanding rear tubes connected at one end respective end thereof, normal, to each of the respective base parallel tubes, and to which upstanding tubes a handle is attached at the other respective end thereof, said handle having a thereon a releaseable arm engaging means, and a convertible section comprising a U-shaped section having a pivot arm pivotally attached thereto, said convertible section being pivotally mounted to said rear tubes; such that when the pivot arm is releaseably engaged to the handle's arm engaging means, the U-shaped section is in a generally vertical position, and when disengaged, the section is in a generally horizontal position.

14. The apparatus of claim 13, further including one of a pair of spaced rear angled supports are respectively connected both to one of the upstanding rear tubes and to one of the cross members.

15. The apparatus of claim 14, further including a cart-tray releasably engageable to the convertible section thereof.

16. The cart of claim 13 wherein the said convertible section is fixedly mounted to said rear tubes; such that the pivot arm is permanently engaged to the handle's arm whereby, the U-shaped section is fixedly disposed in a generally vertical position.

17. A convertible cart primarily for restaurant use, having a base section, a pedal controlled elevator for receiving and transportation of at least one stacking chair, and a convertible section that stands erect out of the way when the cart is used to carry chairs, and which convertible section can move to a horizontal position for carrying of non-invention related common restaurant items, but not limited to dishes, pots, waste food and other items found in restaurants, said cart's base section comprising a pair of casters at the front and a pair of wheels disposed at the rear of a pair of aligned parallel tubes, which parallel tubes are connected by a lower tube and connected also by cross members between said aligned parallel tubes;

said cart also having a pair of spaced upstanding rear tubes connected at one end respective end thereof, normal, to each of the respective base parallel tubes, and to which upstanding tubes a handle is attached at the other respective end thereof, said handle having a thereon a releaseable arm engaging means, and wherein an elevator portion is attached to the middle cross member, said elevator portion comprising an elevator platform, connected to a square tube disposed over a slider, the movement of which is controlled by an interlinked foot pedal and further wherein the movement of the elevator is dampened by the presence of a hydraulic damper operatively connected to said square tube and connected to one of the cross members of the base.

18. The apparatus of claim 17, further including one of a pair of spaced rear angled supports are respectively connected both to one of the upstanding rear tubes and to one of the cross members spaced laterally from said foot pedal.

19. The apparatus of claim 17, further including a cart-tray having ends that have cutouts therein sized for the releaseable engagement to the convertible section thereof.

20. The apparatus of claim 17, further including means to lock the convertible section into one of two fixed positions, which are an upright position and a horizontal position.

21. A convertible cart primarily for restaurant use comprising a base having a front portion and a rear portion, said base includes a pair of casters at the front portion, a pair of wheels at the rear portion and a pair of spaced upstanding rear tubes attached to the rear portion of the base, to which a handle is attached said handle having thereon a releaseable arm engaging means, and a convertible section comprising a U-shaped section having a pivot arm pivotally attached thereto, said convertible section being pivotally mounted to an upper end of the pair of spaced upstanding rear tubes, such that when the pivot arm is releaseably engaged to the handle's arm engaging means, the U-shaped section is in a generally vertical position.

* * * * *